(12) United States Patent
Liu et al.

(10) Patent No.: US 11,287,004 B1
(45) Date of Patent: Mar. 29, 2022

(54) GRAPHENE-BASED WET FRICTION MATERIAL

(71) Applicant: Alto Products Corporation, Atmore, AL (US)

(72) Inventors: Juncheng Liu, Pensacola, FL (US); David Landa, Penscola Beach, FL (US); Ray Engel, Pensacola, FL (US)

(73) Assignee: Alto Products Corporation, Atmore, AL (US)

( * ) Notice: Subject to any disclaimer, the term of this patent is extended or adjusted under 35 U.S.C. 154(b) by 256 days.

(21) Appl. No.: 16/589,787

(22) Filed: Oct. 1, 2019

(51) Int. Cl.
| | |
|---|---|
| *F16D 69/02* | (2006.01) |
| *F16D 13/64* | (2006.01) |
| *C09K 3/14* | (2006.01) |
| *F16D 65/04* | (2006.01) |
| *C04B 41/52* | (2006.01) |
| *F16D 13/74* | (2006.01) |
| *C04B 41/50* | (2006.01) |
| *C04B 35/78* | (2006.01) |
| *C04B 41/61* | (2006.01) |
| *F16D 13/72* | (2006.01) |

(52) U.S. Cl.
CPC ............ *F16D 69/023* (2013.01); *C04B 35/78* (2013.01); *C04B 41/5022* (2013.01); *C04B 41/52* (2013.01); *C04B 41/61* (2013.01); *C09K 3/149* (2013.01); *F16D 13/64* (2013.01); *F16D 65/04* (2013.01); *F16D 13/72* (2013.01); *F16D 13/74* (2013.01)

(58) Field of Classification Search
None
See application file for complete search history.

(56) References Cited

U.S. PATENT DOCUMENTS

| | | | |
|---|---|---|---|
| 7,566,410 | B2 | 7/2009 | Song et al. |
| 9,067,385 | B2 | 6/2015 | Kang et al. |
| 9,285,020 | B2 | 3/2016 | Rokosz et al. |
| 9,428,388 | B2 | 8/2016 | Lakrout et al. |
| 9,689,446 | B2 | 6/2017 | Cho et al. |
| 10,000,036 | B2 | 6/2018 | Kang et al. |
| 10,012,279 | B2 | 7/2018 | Wall et al. |
| 10,125,833 | B2 | 11/2018 | Kang |
| 10,138,969 | B2 | 11/2018 | Hattori et al. |
| 10,156,276 | B2 | 12/2018 | Sin Xicola et al. |
| 2013/0015409 | A1* | 1/2013 | Fugetsu ............... B82Y 30/00 252/500 |
| 2014/0117745 | A1 | 5/2014 | Wilke et al. |
| 2016/0115293 | A1* | 4/2016 | Aksay ..................... C08K 3/04 524/496 |
| 2017/0184164 | A1 | 6/2017 | Bean et al. |
| 2017/0369713 | A1* | 12/2017 | Poteet ..................... C09D 5/084 |
| 2017/0370430 | A1 | 12/2017 | Dunlap |
| 2017/0370431 | A1 | 12/2017 | Dunlap et al. |
| 2018/0128335 | A1* | 5/2018 | Sin Xicola ............ F16D 69/026 |
| 2018/0216684 | A1 | 8/2018 | Gruss et al. |
| 2018/0291974 | A1 | 10/2018 | Kesovan et al. |
| 2018/0362112 | A1 | 12/2018 | Meggiolan et al. |
| 2018/0363717 | A1 | 12/2018 | Hourihan |

(Continued)

*Primary Examiner* — Colby M Hansen
(74) *Attorney, Agent, or Firm* — Peter Loffler

(57) ABSTRACT

A resin impregnated wet friction material that serves as the friction lining on either a clutch plate or a brake pad plate is formed as a paper matrix. The composition of the paper matrix contains graphene nanoparticles as an aid for thermal capacity and conductivity.

12 Claims, 3 Drawing Sheets

(56) References Cited

U.S. PATENT DOCUMENTS

2019/0063525 A1    2/2019   Wall et al.
2019/0077718 A1    3/2019   Garnier
2019/0078635 A1    3/2019   Sin Xicola et al.
2019/0101174 A1    4/2019   Huang

* cited by examiner

GRAPHENE-BASED WET FRICTION MATERIAL

BACKGROUND OF THE INVENTION

1. Field of the Invention

The present invention relates to the use of graphene to produce a wet friction material used to form a friction lining used in a wet friction environment, such as a transmission clutch plate or wet friction brake pad plate, in order to increase the overall heat dissipation of the plate.

2. Background of the Prior Art

The wet friction materials used for friction clutch & brake applications, especially for the heavy-duty high-performance transmission applications, require high power density, that is the energy power exerting onto a unit of surface of engagement. The thermal resistance and conductivity (capability of dissipating heat), mechanical strength, including compressive and shear strength, and elastic modulus of the wet friction materials all relate to the power density and thus have to be judiciously considered while addressing new wet friction material formulations and processing design.

Paper based wet friction materials are commonly known as insulators that render an accumulation of heat generated at surface of engagement. The high heat trapped thereat results in a degradation of the thermally unstable resin and other ingredients used to form the friction material which tends to degrade and eventually destroy the integrity of the wet friction material. The wet friction material design challenge can be overcome through intelligent design of either porous or conductive wet friction materials. High porosity of the material allows the automotive transmission fluid used within a transmission environment to squeeze in and out of the pores of the wet friction material through engagement and disengagement of the clutch so as to efficiently take the heat away. Efforts have been made in developing porous wet friction materials for the heavy-duty, torque converter, and dual clutch transmission applications, however, the achievement of high porosity has to be balanced against the mechanical strength of the clutch friction lining. This compromise of competing characteristics results in a limitation of material design. Moreover, the friction modifier and additives present in the automotive transmission fluid tends to diminish the porosity glazing of the surface of the clutch, resulting in a decreased friction coefficient and energy capacity of the wet friction material over time.

Accordingly, it appears that the best way of achieving high power density of the clutch plates is by developing highly conductive yet relative porous wet friction materials. Such a design facilitates both the fluid and solid based heat transfer while retaining lower elastic modulus and good mechanical strength of the wet friction material. As such, the use of high thermal conductive ingredients is crucial for producing wet friction materials that have improved energy capacity and power density. Unfortunately, the environmental risk and high hardness of the thermally conductive metals like copper and steel prevent their use in making wet friction materials.

Soft carbon materials like graphite flake, activated carbon powder, and carbon fibers including carbon woven fibers, have been employed for making wet friction materials including wet friction clutch & brake applications, although no significantly high thermal conductivity has been verified or reported in the wet friction materials' performance.

Therefore, a challenge still exists to further improve the thermal conductivity of the wet friction material while retaining the material strength and resiliency as needed for the application of the material.

SUMMARY OF THE INVENTION

The graphene-based friction material of the present invention addresses the aforementioned challenges in the art through a design that facilitates both the fluid and solid based heat transfer while retaining lower elastic modulus and good mechanical strength of the wet friction material. The present invention relies on the involvement of high thermally conductive ingredients, specifically centered around the use of graphene nanoplatelets, for making the wet friction material which results in improved energy capacity and power density of the end product. Graphene exhibits excellent mechanical strength and thermal conductivity properties, each needed for high end wet friction applications such as heavy-duty transmissions and torque convertors. The use of graphene nanoplatelets in producing wet friction materials results in an end product that has improved heat dissipation characteristics. The increased heat transfer gained through the high thermal conductivity afforded by the use of the graphene results in lower interface temperatures in a wet clutch environment so that degradation of the friction material due to high operating temperatures is reduced.

The graphene-based friction material exhibits superior power density and friction coefficient relative to traditional paper based porous materials and carbon woven materials used in heavy-duty applications.

The graphene-based friction material of the present invention is comprised of a friction plate member that has a first side and a second side. A first friction lining is attached on the first side of the friction plate member. The first friction lining is a resin impregnated paper matrix wherein a composition of the paper matrix contains graphene nanoplatelets. The composition of the paper matrix contains graphene nanoplatelets in the range of about 3 percent to about 6 percent by weight. The friction plate member may be a clutch plate so that a second friction lining is located on the second side of the friction plate member, this second friction lining being made from the same paper matrix used to form the first friction lining. Alternately, the friction plate member may be a brake pad plate.

BRIEF DESCRIPTION OF THE DRAWINGS

Similar reference numerals refer to similar parts throughout the several views of the drawings.

DESCRIPTION OF THE PREFERRED EMBODIMENT

Figure 1:
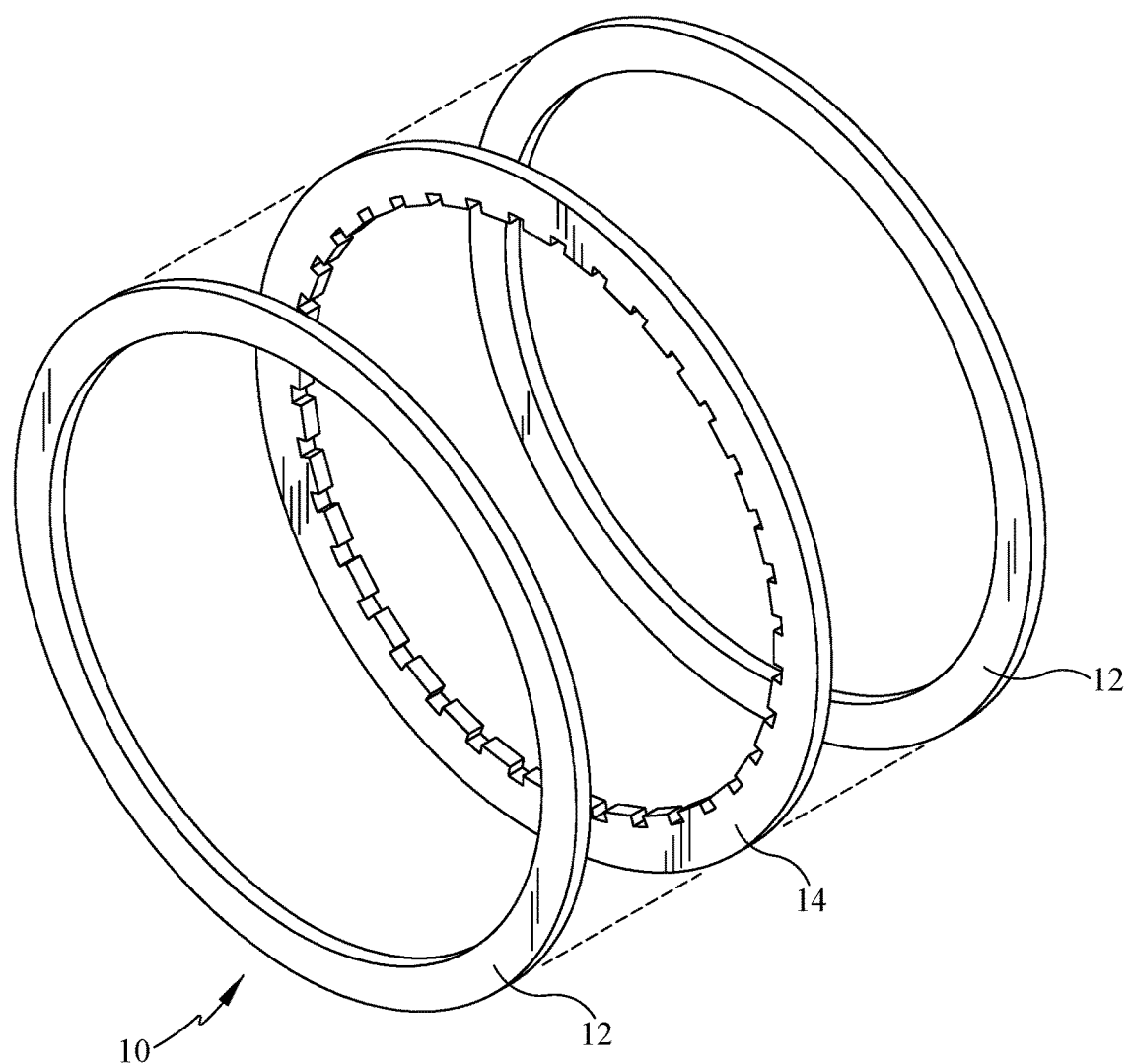
FIG. 1 is an exploded perspective view of a clutch plate produced from the graphene-based friction material of the present invention.

Referring now to the drawings, it is seen that the graphene-based friction material of the present invention, generally denoted by reference numeral 10, is comprised of a wet friction material that is formed in any desired method known in the art. The wet friction material is formed as a paper matrix and then formed into a friction lining 12 which is attached in any appropriate manner to various percentages of manmade and synthetic fibers (e.g. cotton, carbon, aramid, glass, etc.) are selected based on their ability to improve thermal resistance, material strength and porosity, various fillers types (carbons, diatoms, etc.). The selection of each material is based on the desired balance of paper integrity, binder types (e.g. latex) and percentage to improve paper making processing and resins types (phenolics, modified phenolics, etc.) and to improve friction paper mechanical strength and flexibility. Our invention, by introducing graphene nanoplatelets into the wet friction material's paper matrix, imparts a significant improvement of the paper thermal conductivity of the wet friction material and thereby facilitates efficient heat dissipation in a wet clutch and brake environment Below is one formulation that creates a highly thermally efficient wet friction material, although others, including the choice of resins used, are possible within the scope and spirit of our invention. The formulation includes graphene nanoplatelets in the range of about 3 to about percent by weight, a less fibrillated aramid fiber possessing 400-650 in Canadian Standard Freeness in the range of about 5 percent to about 20 percent by weight, activated carbon particles in the range of about 10 percent to about 35 percent by weight, cotton fibers in the range of about percent to about 15 percent by weight, carbon based fiber in the range of about 5 percent to about 15 percent by weight, graphite flake in the range of about 10 percent to about 30 percent by weight, and latex in the range of about 5 percent to about 15 percent by weight. The incorporation of the less fibrillated aramid fiber, the cotton fibers, and the carbon fibers is mainly to reinforce the integrity of the wet friction material matrix while providing a desirable porous structure. The relatively low amount of the cotton fibers included in the wet friction material is for imparting "break-in" characteristics of the friction material as well as to give the material a higher coefficient of friction. The carbon-based fibers and carbon particles (such as active carbon powders), and the graphite flakes, together with the graphene nanoplatelets, increase the thermal resistance while retaining high thermal conductivity of the wet friction material in order to achieve efficient heat transfer on surface of engagement. The latex works as a binder to bond the fibers and fillers together in order to improve the material tensile strength and integrity of the raw friction material matrix (raw friction paper) prior to its impregnation by an appropriate resin.

If phenolic resin is relied solely for the saturation of the wet friction material, the result has an engagement surface that is rigid and brittle so as to render inefficient surface contact between the friction plate and the mating reaction plate. This results in localized heat on the engagement surface and corresponding hot spots on the mating steel plate under high pressure power applications. Accordingly, Tung-oil or silicon resins are mixed together with the phenolic resin in a ratio of about 1:3 in order to improve the flexibility of the working surface during the engagement. This improved flexibility avoids localized heat on the engagement surface and the corresponding hot spots on the mating reaction plate.

The phenolic resin, residing in a compatible solvent, is blended or mixed with either the Tung oil or silicon resin for the impregnation of the raw friction paper. Upon resin impregnation of the dry friction material matrix, the impregnated friction material matrix is cured under a temperature of about 350° F. for about 10 minutes after which the final product is a paper matrix used to form the wet friction material. The resin pick-up in the paper matrix is in the range of about 25 percent to about 45 percent by weight.

Figure 4:
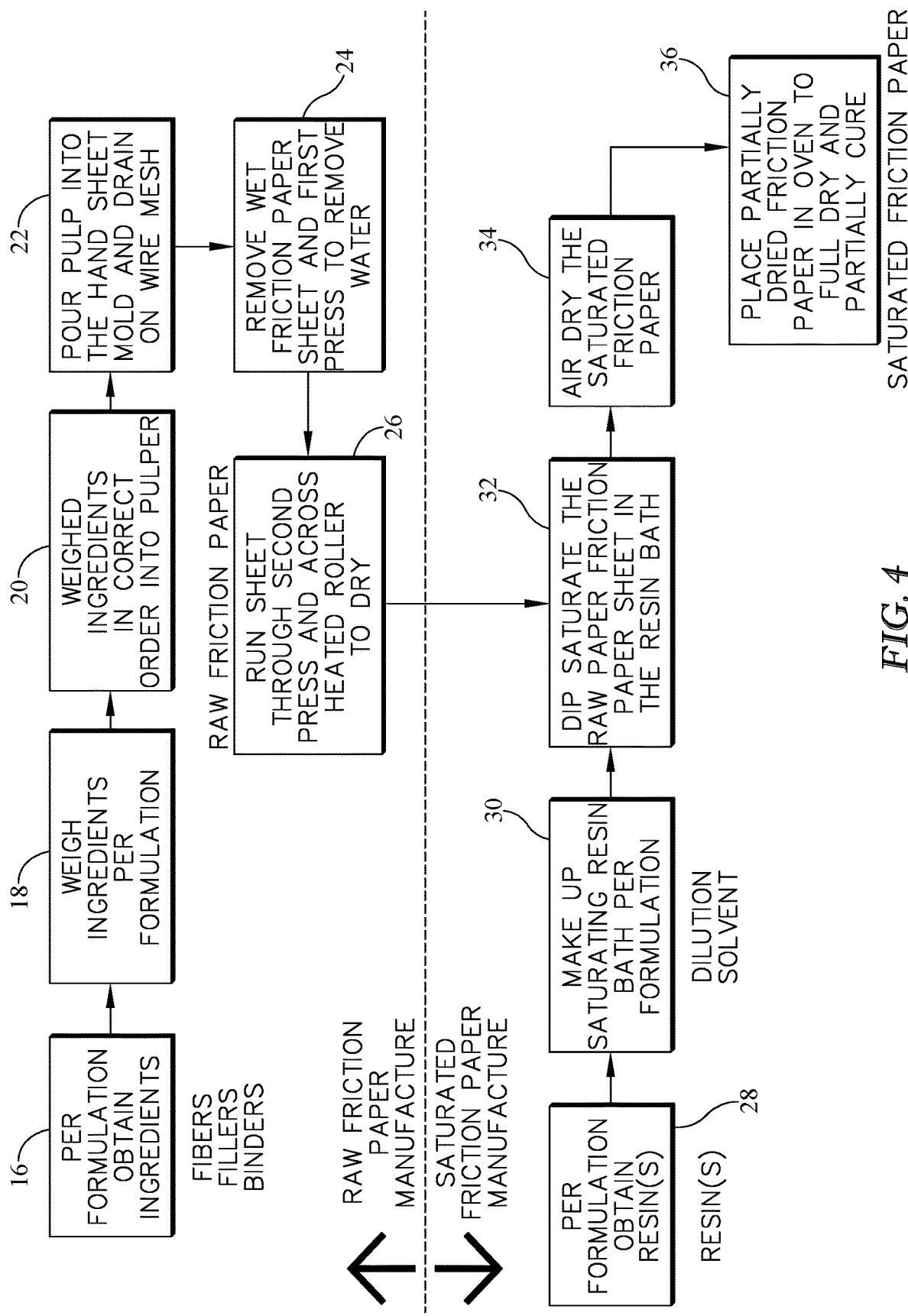
FIG. 4 is a schematic view of a typical process employed to produce the graphene-based friction material.

A typical process for creating a resin impregnated paper matrix is schematically illustrated in FIG. 4. In order to prepare the raw friction paper, the desired ingredients are obtained 16. Each ingredient is weighted for its correct proportion per the formulation 18. The weighed ingredients are placed in their correct order into a pulper 20. During the pulping of the materials used for the raw friction paper, pH adjustments are made to about pH 8-10 using NaOH to improve dispersion of latex followed by an adjusting pH to 4-5 with alum to precipitate the latex achieving its bonding function for fibers and fillers. A retention aid of a cationic water-soluble polymer is added for an efficient flocculation of the pulp, helping the small sized filler particles obtain sufficient size, preventing them (particularly the graphene nanoplatelets) from falling through the wire mesh, thereby retaining consistent formulation weights. The resulting pulp is conveyed onto a paper mold and allowed to drain onto a wire mesh 22. The wet friction paper is removed from the wire mesh and then run through a press of heated roller to remove moisture a first time 24 and a second time 26. The resulting raw paper matrix is ready for saturation.

The resin ingredients are obtained per their formulation amounts 28. An impregnation bath is produced and mixed with a dilution solvent 30. The raw paper matrix is dipped into the resin bath 32. The resulting paper matrix, impregnated with resin, is first air dried 34 and then placed in an oven to complete the drying and to partially cure the product 36. The result is a resin impregnated friction paper or wet friction material. The paper is then wound or sheeted for subsequent production.

Figure 2:
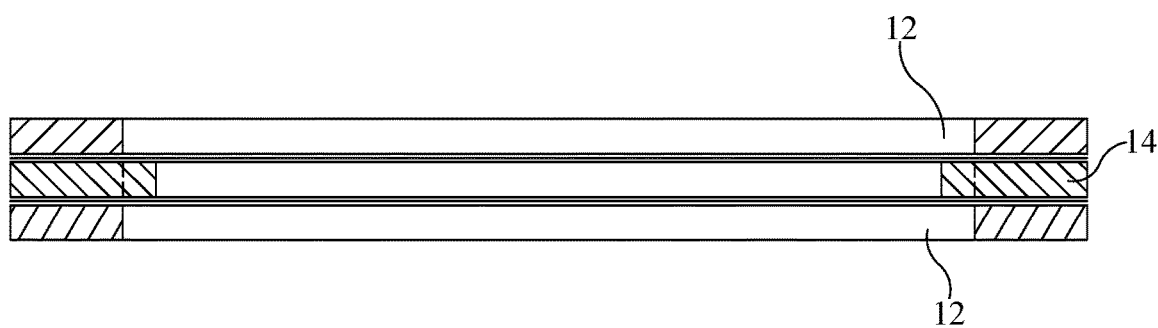
FIG. 2 is a side elevation view of the assembled clutch plate of FIG. 1.
Figure 3:
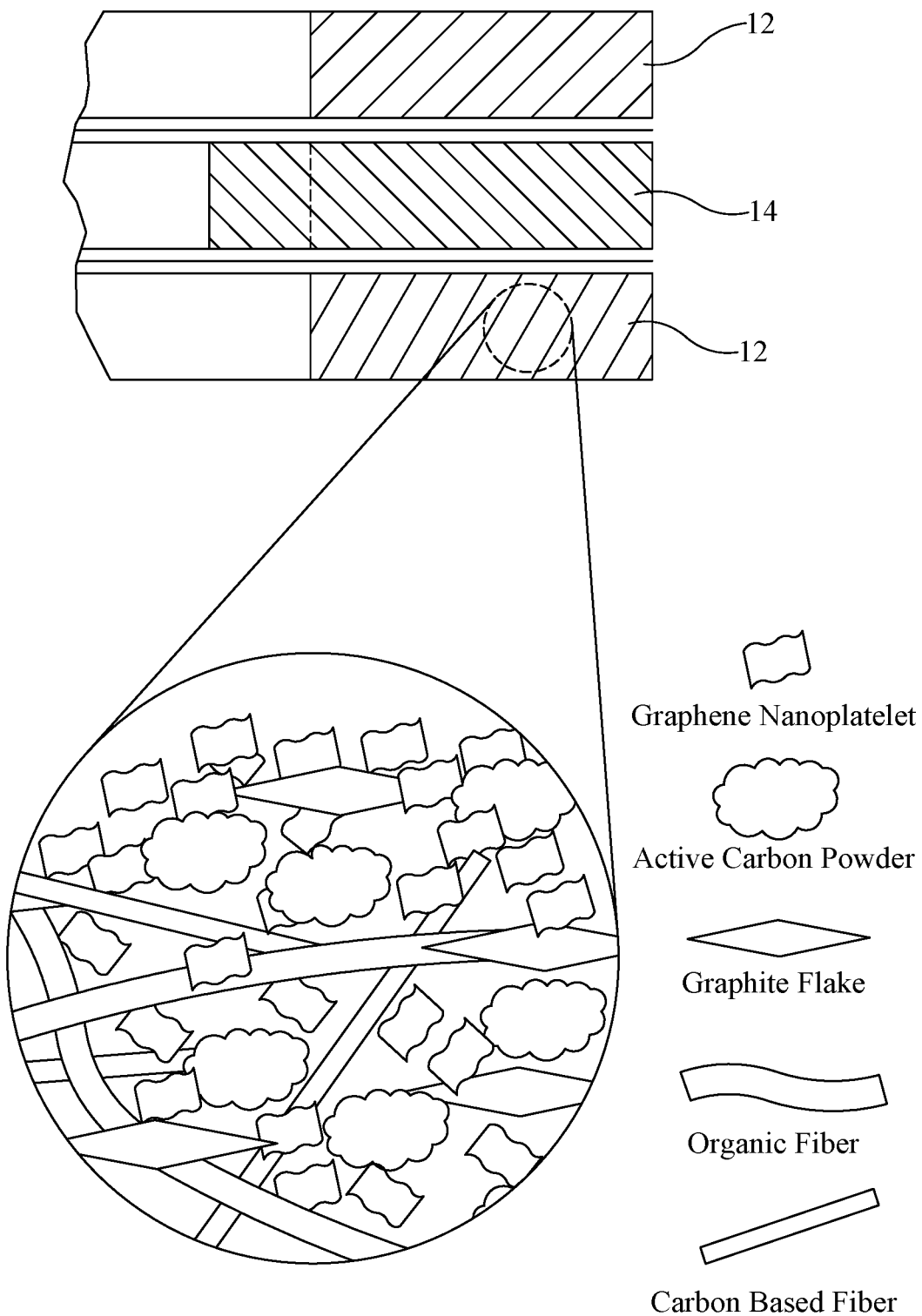
FIG. 3 is sectioned close-up view of a portion of the clutch plate.

Thereafter, the wet friction material is formed into its desired shape, such as a plate lining as seen in FIGS. 1 and 2, and attached to a clutch plate 14 or brake pad plate in appropriate manner.

The specific graphene nanoplatelets used are exfoliated raw and natural graphite nanoplatelets. Such graphene nanoplatelets are short stacks of graphene sheets in the form of an ultra-thin platelet having average diameter of about 25 μm, a thickness of about 21 nm, a surface area of about 60 $m^2/g$, and a bulk density of 55 $mg/cm^3$. Advantageously, the graphene nanoplatelet is highly purified in carbon content, yet possesses a high crystalline structure low in defects. This bulk material should have a pristine graphitic surface of $sp^2$ carbon molecules that, along with its fluffy characteristic, makes the bulk material especially suitable for applications requiring high thermal conductivity. These graphene nanoplatelets also improve mechanical properties such as stiffness, abrasion resistance, and surface hardness of the matrix material. However, other forms of graphene can also be employed.

Such graphene nanoplatelets are compatible with resin, forming a stable nanoplatelet suspension upon an efficient mixing process, so as to be a favorable ingredient working with resin for both top saturation and roller-based coating processes. It is noted that the graphene nanoplatelets can either be top saturated on the wet friction clutch or surfaced coated thereon top by employing a top saturation/filtration process or roller-based coating process, respectively. These processes would be able to achieve higher concentration of graphene nanoplatelets in the clutch contact surface for improved performance while without significantly compromising product cost.

While the invention has been particularly shown and described with reference to an embodiment thereof, it will be appreciated by those skilled in the art that various changes in form and detail may be made without departing from the spirit and scope of the invention.

We claim:

1. A wet friction plate comprising a friction plate member having a first side and a second side such that a first friction lining is attached on the first side of the friction plate member wherein the first friction lining is a resin impregnated paper matrix wherein a composition of the paper matrix contains graphene nanoplatelets in the range of between 3 percent and 6 percent of the graphene nanoplatelets by weight and wherein the paper matrix is formed by aqueous pulping on a wire mesh, followed by a draining process, followed by post-saturation with the resin so that the paper matrix that is porous, compressible, and resilient and such that the friction plate member is disposed and operates within a wet friction environment.

2. The wet friction plate as in claim 1 wherein the friction plate member is a clutch plate.

3. The wet friction plate as in claim 1 further comprising a second friction lining attached on the second side of the friction plate member wherein the second friction lining is formed from the resin impregnated paper matrix.

4. The wet friction plate as in claim 3 wherein the friction plate member is a clutch plate.

5. The wet friction plate as in claim 3 wherein the resin is phenolic and silicone based.

6. The wet friction plate as in claim 1 wherein the resin is phenolic and silicone based.

7. A friction plate comprising a friction plate member having a first side and a second side such that a first friction lining is attached on the first side of the friction plate member wherein the first friction lining is a resin impregnated paper matrix wherein a composition of the paper matrix contains graphene nanoplatelets in the range of between 3 percent and 6 percent of the graphene nanoplatelets by weight and wherein the paper matrix is formed by aqueous pulping on a wire mesh, followed by a draining process, followed by post-saturation with the resin so that the paper matrix that is porous, compressible, and resilient and such that the friction plate member is a wet friction plate member.

8. The friction plate as in claim 7 wherein the friction plate member is a clutch plate.

9. The wet friction plate as in claim 7 wherein the resin is phenolic and silicone based.

10. The wet friction plate as in claim 7 further comprising a second friction lining attached on the second side of the friction plate member wherein the second friction lining is formed from the resin impregnated paper matrix.

11. The wet friction plate as in claim 10 wherein the friction plate member is a clutch plate.

12. The wet friction plate as in claim 10 wherein the resin is phenolic and silicone based.

* * * * *